United States Patent
Wippermann et al.

(10) Patent No.: US 8,587,882 B2
(45) Date of Patent: Nov. 19, 2013

(54) OPTICAL LAYER STACK AND METHOD FOR MANUFACTURING THE SAME

(75) Inventors: Frank Wippermann, Meiningen (DE); Jacques Duparré, Jena (DE); Peter Dannberg, Jena (DE); Andreas Braeuer, Schloeben (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 13/314,940

(22) Filed: Dec. 8, 2011

(65) Prior Publication Data

US 2012/0200946 A1 Aug. 9, 2012

Related U.S. Application Data

(63) Continuation of application No. PCT/EP2010/069779, filed on Dec. 15, 2010.

(30) Foreign Application Priority Data

Dec. 21, 2009 (DE) .......................... 10 2009 055 083

(51) Int. Cl.
- *G02B 7/02* (2006.01)
- *G02B 27/10* (2006.01)
- *G03B 21/60* (2006.01)
- *B29D 11/00* (2006.01)

(52) U.S. Cl.
USPC ............................ 359/811; 359/455; 359/619

(58) Field of Classification Search
USPC ......... 359/811, 821–823, 618–621, 625–626, 359/443, 454–455, 665–667, 459, 450; 264/1.1, 1.32, 2.7

See application file for complete search history.

(56) References Cited

U.S. PATENT DOCUMENTS

| | | |
|---|---|---|
| 3,211,811 A | 10/1965 | Lanman |
| 4,113,224 A | 9/1978 | Clark et al. |
| 4,895,430 A | 1/1990 | Jalink et al. |
| 5,110,514 A | 5/1992 | Soane |
| 5,269,867 A | 12/1993 | Arai |
| 5,510,818 A | 4/1996 | Shimomura et al. |

(Continued)

FOREIGN PATENT DOCUMENTS

| | | |
|---|---|---|
| DE | 19610881 | 3/1996 |
| DE | 19610881 | 6/1997 |

(Continued)

OTHER PUBLICATIONS

Lim, Jiseok et al., "Fabrication of Hybrid Microoptics Using UV Imprinting Process with Shrinkage Compensation Method", Japanese Journal of Applied Physics, vol. 47, No. 8, 2008, Aug. 2008, 6719-6722.

*Primary Examiner* — Dawayne A Pinkney
(74) *Attorney, Agent, or Firm* — Michael A. Glenn; Perkins Coie LLP

(57) ABSTRACT

An optical layer stack having a first layer, a second layer, a first spacer part associated with the first layer and a second spacer part associated with the second layer, wherein the two spacer parts have groove and tongue for an engagement in a stacking direction of the optical layer stack in order to provide a connection between the first and the second spacer part and a spacing of the first and the second layer in stacking direction.

19 Claims, 12 Drawing Sheets

(56) References Cited

U.S. PATENT DOCUMENTS

| | | |
|---|---|---|
| 5,944,324 A | 8/1999 | Schultheis et al. |
| 6,344,162 B1 | 2/2002 | Miyajima |
| 6,603,612 B2 | 8/2003 | Nakano |
| 6,621,631 B2 | 9/2003 | Lissotshenko et al. |
| 6,954,311 B2 | 10/2005 | Amanai |
| 7,567,754 B2 | 7/2009 | Kinoshita |
| 2002/0071190 A1 | 6/2002 | Wada et al. |
| 2005/0030647 A1 | 2/2005 | Amanai |
| 2005/0057734 A1 | 3/2005 | Johannes-Steven et al. |
| 2005/0094260 A1* | 5/2005 | Tokuda et al. ............ 359/368 |
| 2005/0212156 A1 | 9/2005 | Tokita et al. |
| 2006/0114580 A1 | 6/2006 | Mori et al. |
| 2007/0159703 A1 | 7/2007 | Apel et al. |
| 2007/0190196 A1 | 8/2007 | Bandic et al. |
| 2008/0100934 A1 | 5/2008 | Webster et al. |
| 2008/0143019 A1 | 6/2008 | Chou et al. |
| 2009/0015945 A1 | 1/2009 | Chen |
| 2009/0251800 A1 | 10/2009 | Iwai |

FOREIGN PATENT DOCUMENTS

| | | |
|---|---|---|
| DE | 19717014 | 10/1998 |
| DE | 10 2005 059161 | 6/2007 |
| DE | 102005059161 | 6/2007 |
| EP | 0322353 | 6/1989 |
| EP | 0543202 | 5/1993 |
| EP | 1630580 | 3/2006 |
| EP | 1705507 | 9/2006 |
| EP | 1796168 | 6/2007 |
| JP | H02-042568 | 2/1990 |
| JP | H08-320402 | 12/1996 |
| JP | H09-286038 | 4/1997 |
| JP | 2000227505 | 8/2000 |
| JP | 2001318288 | 11/2001 |
| JP | 2002350605 | 12/2002 |
| JP | 2004029554 | 1/2004 |
| JP | 2004088713 | 3/2004 |
| JP | 2004-133073 | 4/2004 |
| JP | 2004133073 | 4/2004 |
| JP | 2005018024 | 1/2005 |
| JP | 2005300715 A | 10/2005 |
| JP | 2006030894 | 2/2006 |
| JP | 2006267158 | 10/2006 |
| WO | WO-03004255 | 1/2003 |
| WO | WO-2005003820 | 1/2005 |
| WO | WO 2008/146644 | 5/2008 |
| WO | WO-2008059695 | 5/2008 |
| WO | WO-2009069940 | 6/2009 |
| WO | WO-2009085883 | 7/2009 |
| WO | WO-2009110883 | 9/2009 |

* cited by examiner

OPTICAL LAYER STACK AND METHOD FOR MANUFACTURING THE SAME

CROSS-REFERENCE TO RELATED APPLICATIONS

This application is a continuation of copending International Application No. PCT/EP2010/069779, filed Dec. 15, 2010, which is incorporated herein by reference in its entirety, and additionally claims priority from German Application No. DE 10 2009 055 083.6, filed Dec. 21, 2009, which is also incorporated herein by reference in its entirety.

BACKGROUND OF THE INVENTION

The present invention relates to an optical layer stack as it may, for example, be used for optoelectronic systems and, in particular, to the mechanical spacing of individual layers of the optical layer stacks.

Optoelectronic systems or layer stacks as they are schematically illustrated in FIGS. 10a to 10c are, for example used in digital cameras, wireless devices having a photography function and many other applications. In the manufacturing of opto-electronic systems, e.g., micro objectives for mobile telephones, tight manufacturing and adjustment tolerances in a range of a few micrometers (μm) have to be adhered to. In the manufacturing of such optoelectronic systems in panels, i.e., on wafer level, this means that individual layers or sheets of the optoelectronic system (e.g., wafers having lenses 1002, spacer wafers 1004 for realizing air spaces or optically used areas 1006) are to be manufactured with a high mechanical precision as manufacturing tolerances have an influence on the optical characteristics of the optoelectronic system. This among others leads to high manufacturing costs or little process yield.

Needed layers or sheets of lens and so-called spacer wafers are manufactured individually according to many different methods. Lenses 1002 advantageously consist of UV-curable polymer and are arranged on a glass substrate. Several of these glass substrates 1008 are then stacked onto each other and advantageously joined by means of UV-curable adhesive. Needed air spaces 1006 between the lenses 1002 are generated by the spacer wafers 1004 representing spacer layers comprising through holes.

Tight axial position tolerances of the lens areas resulting from a function of the optical layer stack here have to be met by mechanical thickness tolerances of the individual layers and the thickness tolerances of the adhesive layers. Thus, high requirements to dimensional accuracy of mechanical components result which contribute to setting the spacing of optical components 1002, e.g., lenses, only restrictedly, with respect to the optical function of the optical or optomechanical layer stack. Here, advantageously glass materials are used as spacer layers 1004 (spacer wafers) as the same fulfill a requirement with respect to high temperature resistance. In a monolithic implementation, i.e., no use of glass wafers, temperature resistant polymers are used. In both cases structures used for spacing the optically effective areas are transparent, which may be a disadvantage for the optical function as a result of the penetration of false light.

The different materials for layers having optically effective elements, spacer layers and joining layers are disadvantageous with respect to climate and long-term performance of the resulting optoelectronic system or the optical or optomechanical layer stack used therein. For example, polymers for the manufacturing of optical or micro-optical components by UV replication have a high thermo-optical coefficient, i.e., the refractive index of the material strongly changes with a changing temperature, wherein generally with an increasing temperature the refractive index decreases. The thermo-optical coefficients of such materials are approximately 10 to 100 times higher than those of glass materials which are otherwise used in optics. Consequently, the refractive power of a lens of UV polymer materials may substantially reduce with temperature changes which, in case of imaging optics, leads to an increase of the image-side focal length. When maintaining the spacing between lens and image, a defocusing and thus a deterioration of imaging quality results.

As a consequence of the increase of the focal length with an increasing temperature caused by a thermal expansion of the lens material and the dependence of the refractive index on the temperature, an increase of the focal length between the last lens and the image position results. As a consequence of thermal expansion of the spacer layers, this spacing is also increased, in principle a compensation of thermal defocusing (athermization) may be achieved. For lens materials with a small thermo-optical coefficient, e.g., glass, this is possible using spacer materials having adapted thermal expansion coefficients. In contrast to this, for athermization of objectives having plastics lenses, materials having a coefficient of expansion of some $100 \times 10^{-6}$/K are needed which are not known in conventional technology.

SUMMARY

According to an embodiment, an optical layer stack may have a first layer; a second layer; a first spacer part associated with the first layer; and a second spacer part associated with the second layer, wherein the two spacer parts comprise groove and tongue for an engagement in a stacking direction of the optical layer stack and for a shiftability of the first spacer part with respect to the second spacer part in the lateral direction and in the stacking direction the tongue comprises a smaller width than the groove, wherein the first and the second spacer part are connected to each other by means of an adhesive between groove and tongue in order to provide a connection between the first and the second spacer part and a spacing of the first and second layer in stacking direction.

According to another embodiment, a method for manufacturing an optical layer stack may have the steps of arranging a first layer above a second layer using a first spacer part associated with the first layer and a second spacer part associated with the second layer, wherein the two spacer parts comprise groove and tongue for an engagement in a stacking direction of the optical layer stack and for a shiftabiltiy of the first spacer part with respect to the second spacer part in the lateral direction and in the stacking direction the tongue comprises a smaller width than the groove; and connecting the first and the second spacer part to each other adhesively by means of an adhesive between groove and tongue in order to provide a connection between the first and the second spacer part and a spacing of the first and second layer in stacking direction.

The present invention is based on the finding that an axial position, i.e., a position in vertical or stacking direction of optical components in an optical layer stack is not directly given by thicknesses of spacer layers but that a structure used for realizing a needed spacing consists of two parts formed according to the principle of tongue and groove.

In this respect, embodiments of the present invention provide an optical layer stack comprising a first layer, a second layer, a first spacer part associated with the first layer and a second spacer part associated with the second layer, wherein the two spacer parts comprise tongue and groove for engaging in a stacking direction of the optical layer stack in order to obtain a connection between the first and the second spacer part and a spacing of the first and the second layer in stacking direction.

The tongue of the first (second) spacer part here penetrates into the groove of the second (first) spacer part. Tongue and groove are advantageously implemented so that they circulate an optically used area, like for example an aperture, between the first and the second layer in a closed contour. The tongue has a lesser width than the groove, so that a lateral shifting of the layers or components to be joined is possible. For connecting the components, the groove is filled with an adhesive, i.e. a connecting material, like e.g. a glue, and subsequently the second joining partner is put into the groove with its tongue. Tongue and groove are here dimensioned such regarding their depth or length that a sufficient overlapping area which is filled with the adhesive results in the axial or stacking direction.

According to one embodiment, the adhesive is a permanently elastic material which comprises a higher coefficient of thermal expansion than the surrounding tongue and/or groove material. By this, with a temperature increase, the permanently elastic adhesive may expand more strongly and is restricted in its lateral expansion by the groove geometry. The adhesive here mainly expands in the axial direction, i.e. stacking direction, in which the groove is not restricted to the top (or to the bottom). As a consequence of the elasticity of the adhesive, no substantial compressive stresses are built up and the thermal volume change is basically transferred into a change of length. The effect of the transfer of travel is the higher the greater the difference between the thermal coefficients of expansion of permanently elastic adhesive and tongue and/or groove material. The permanently elastic adhesive thus fulfills two tasks: connection of the joining partners, i.e. the first and second spacer part or portion, and adapting the changes of length to the formed value in μm/Kelvin. When, for example, the first layer carries or forms an imaging optics, like e.g. together with further layers existing on the side opposite to the second layer, a coefficient of thermal expansion of an adhesive of the adhesion connection and a shape of the tongue and groove may be selected so that, across a temperature range from −40° to 80° C., a spacing of an image plane of the imaging optics in the direction of an optical axis of the imaging optics to the second layer deviates by less than ±1% of an objective focal length of the imaging optics at 20° C. from a position of the image plane at 20° C., or that a span of a distribution of spacings of an image plane of the imaging optics in the direction of an optical axis of the imaging optics to the second layer, occurring across a temperature range from −40° to +80°, is less than 2% of an objective focal length of the imaging optics at 20° C., wherein in this image plane, i.e. the plane of best resolution, for example the photo-sensitive area of an image sensor is arranged, so that the image sharpness is maintained across this temperature range. If, however, the first layer carries or forms a first imaging optics and a second layer a second imaging optics, like e.g. together each with other layers to the respective other side, a coefficient of thermal expansion of an adhesive of the adhesion connection and a shape of the tongue and the groove may be selected so that across a temperature range from −40° to 80° C. a spacing of an image plane of a first imaging optics in the direction of a common optical axis of the first and second imaging optics to an object plane of the second imaging optics deviates from 0 by less than ±1% of the larger ones of the objective focal lengths of the first and second imaging optics at 20° C., or that a span of a distribution of spacings of an image plane of the first imaging optics in the direction of a common optical axis of the first and second imaging optics to an object plane of the second imaging optics, occurring across a temperature range from −40° to 80° C., is less than 2% of a larger one of the objective focal lengths of the two imaging optics at 20° C.

Embodiments of the present invention thus on the one hand enable a housing concept for manufacturing opto-electronical mechanical systems in a panel, which decouples component and adjustment tolerances of mechanical components (spaces) from those of optically effective components (lens components). Thus, a cost advantage results in two respects: on the one hand costs in manufacturing additionally needed spacer layers are reduced. On the other hand, the yield of systems manufactured in the panel, i.e. on wafer-level, increases. The spacer layers or structures may further be manufactured in a cost-effective and lightproof polymer and eliminate conventionally needed additional components and manufacturing steps for preventing false light.

Further, in a simple and cost-effective way, a compensation of thermally induced changes of refractive power of optical modules, like e.g. with camera objectives, may be enabled. The compensation of the thermal influence is passive without using additional energy sources or elements functioning at actuators.

Advantageous implementations of the present invention are part of the dependent claims.

BRIEF DESCRIPTION OF THE DRAWINGS

In the following, embodiments of the present invention are explained in more detail with reference to the accompanying drawings, in which.

DETAILED DESCRIPTION OF THE INVENTION

Figure 1:
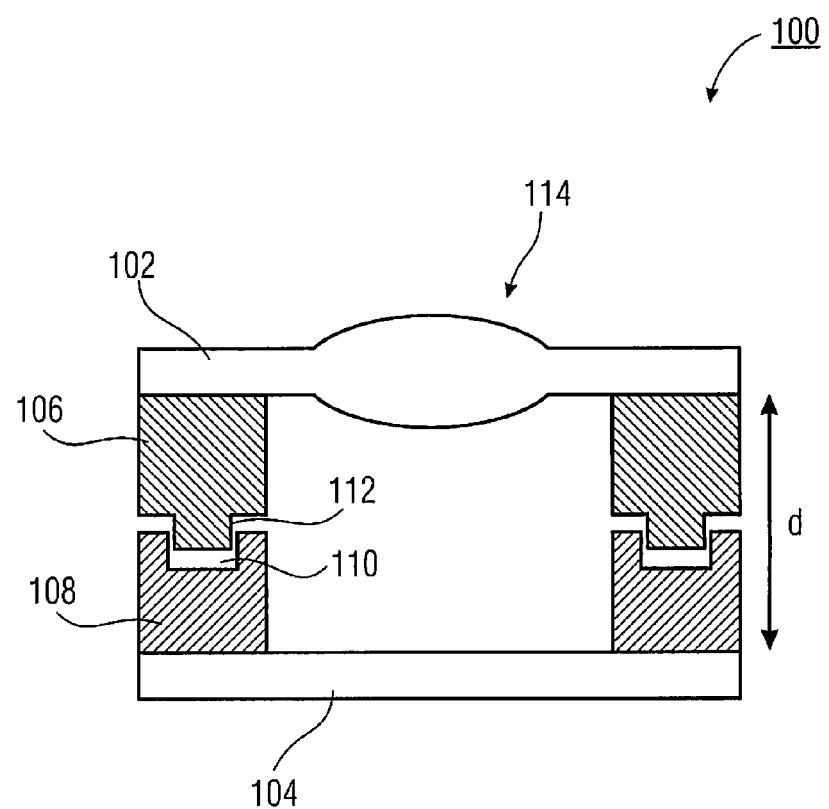
FIG. 1 shows a schematic side view of an optical layer stack according to one embodiment of the present invention.

In the following description, in the different embodiments of the present invention like or seemingly like functional elements may comprise the same reference numerals. Thus, the description of those functional elements in the different embodiments illustrated in the following is interchangeable.

FIG. 1 schematically shows a side view of the optical or opto-mechanical layer stack 100 according to one embodiment of the present invention.

The optical layer stack 100 comprises a first layer 102 and a second layer 104. A first spacer part or portion 106 is associated with the first layer 102. A second spacer part 108 is associated with the second layer 104. The two spacer parts 106, 108 comprise groove 110 and tongue 112 for engaging in a stacking direction of the optical layer stack 100 in order to obtain a connection between the first spacer part 106 and the second spacer part 108 and a spacing of the first layer 102 and the second layer 104 in stacking direction.

Although in FIG. 1 the first spacer part 106 comprises the tongue 112 and the second spacer part 108 the groove 110 it may also be the other way around, i.e. the tongue 112 may be associated with the second spacer part 108 and the groove 110 may be associated with the first spacer part 106. According to embodiments, at least one of the two layers 102, 104 comprises an optical component 114. In the embodiment illustrated in FIG. 1, the optical component 114 which may, for example, be of the group of lenses, prisms, diffractive structures, holographic structures or optical filters, is associated with the first layer 102. Here, the first layer 102 is, for example, a wafer comprising lenses. The second layer 104 may, for example, be a substrate layer having an opto-electronic image sensor (for example CCD or CMOS image sensors) associated with the optical component 114. Likewise, the second layer 104 may also be a further layer comprising optical components 114, like for example lenses, as it is schematically illustrated in FIGS. 2a to 2c.

As it will be described in more detail in the following, a coefficient of thermal expansion of an adhesive contained in the groove 110 and a shape of the groove 110 and the tongue 112 may be selected so that across a temperature range from −40° to 80° C. a spacing of an image plane of the imaging optics 114, like e.g. for an object plane lying in the infinite, or somewhere else in a fixed distance to the optics 114, in the normal or layer thickness direction, i.e. in the direction of an optical axis of the imaging optics 114, to the layer 104, where, for example, the photosensitive area of the above-mentioned image sensor is arranged, deviates by less than ±1% of the objective focal length of the imaging optics 114 at 20° C. from the position of the image plane at 20° C. But if both the layer 102 and also the layer 104 each carry or form an imaging optics, wherein only one 114 is illustrated in FIG. 1, a coefficient of thermal expansion of the adhesive or the adhesion connection between groove 110 and tongue 112 and a shape of the groove 110 and the tongue 112 may be selected so that across a temperature range from −40° to 80° C. a spacing of an image plane of the first imaging optics, like e.g. 114, to an object plane of the second imaging optics, like e.g. the one in layer 104, deviates from zero, i.e. from a perfect overlapping state, in the normal direction by less than ±1% of the larger ones of the objective focal lengths of the two imaging optics, so that the same comprise a very accurately defined intermediate imaging across this temperature range, that is for a predetermined object plane of the optics 114 and a predetermined image plane of the optics in layer 104. It is here to be noted that the above-mentioned imaging objects in layers 102 or 104 are not necessarily merely formed by or in or at the respective layer, but that the imaging objects may be formed together with further layers of the layer stack, which may be arranged on the side facing away from the considered two layers 102 and 104, when the layer stack comprises further layers, in which respect in the following further embodiments will be mentioned.

Figure 2A:
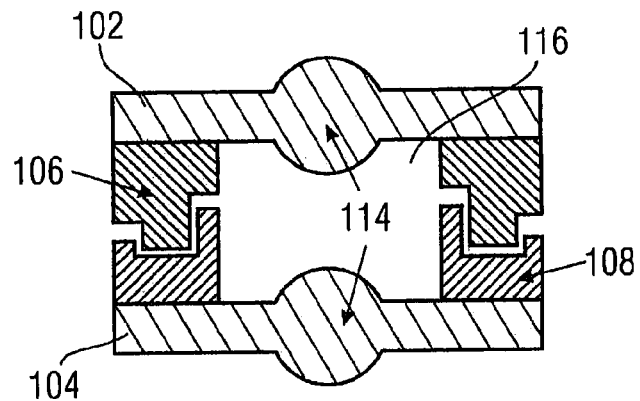
FIGS. 2a-c show side views of an optical layer stack according to a further embodiment of the present invention.
Figure 2B:
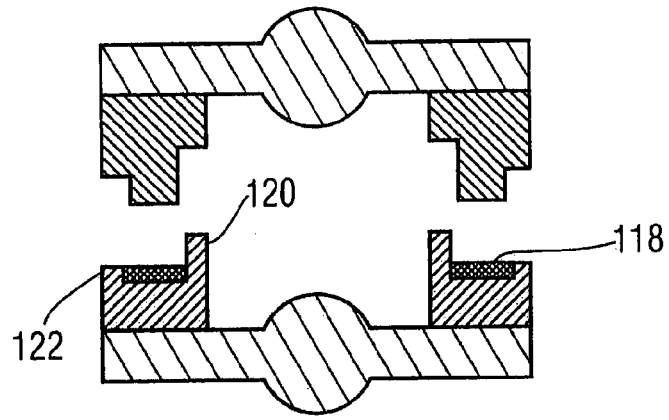
Figure 2C:
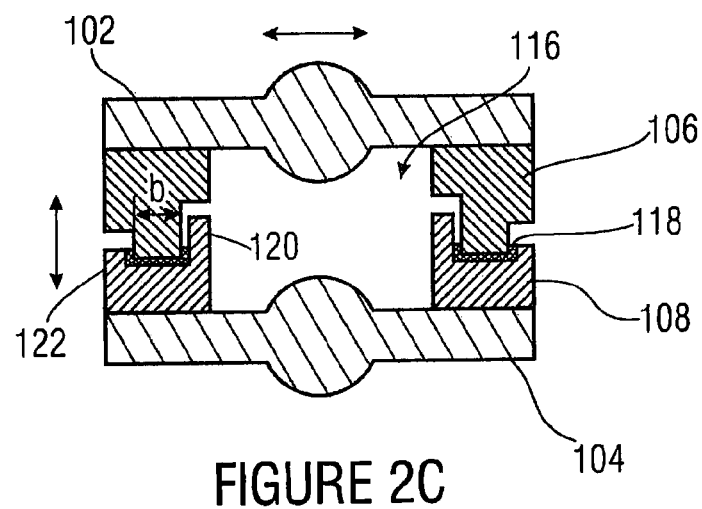

In the embodiments illustrated with respect to FIGS. 2a-2c, the first and second layer 102, 104 and/or the optical components 114 formed therein are a UV-curable substrate-free polymer like e.g. an epoxide. Both the first and also the second spacer part 106, 108 may each consist of a different material than the layers 102, 104 or the optical components 114. Advantageously, the first and/or the second spacer part 106, 108 also consist of a polymer and are manufactured in a cost-effective method like e.g. casting, injection molding, hot stamping, injection stamping or resin transfer molding (RTM). As a polymer for the spacers 106, 108 epoxides may be used which may resist high temperatures and whose optical transmission (transmissive to non-transmissive) may be influenced. According to embodiments, the spacers 106, 108 are each connected to the layers 102, 104. This is, for example, an integer or a firmly bonded connection as it, for example, results from adhering. Firmly bonded connections are generally those connections in which the connecting partners are held together by atomic or molecular forces.

Figure 3A:
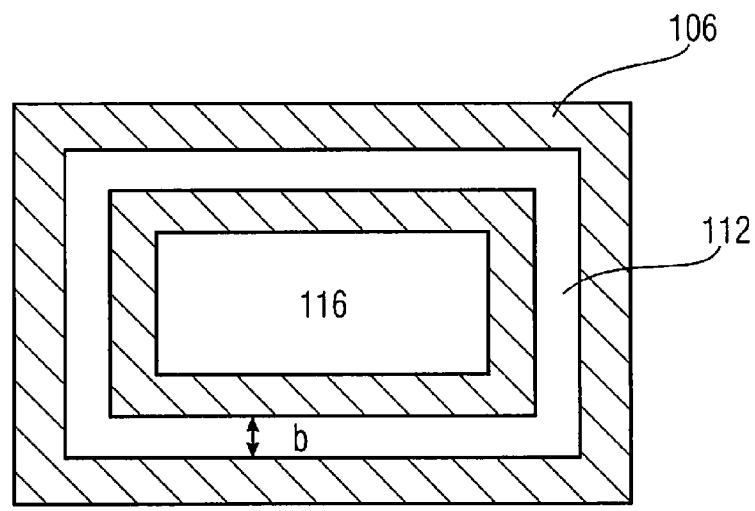
FIGS. 3a,b are top views of a first and second spacer part comprising tongue and groove according to one embodiment of the present invention.
Figure 3B:
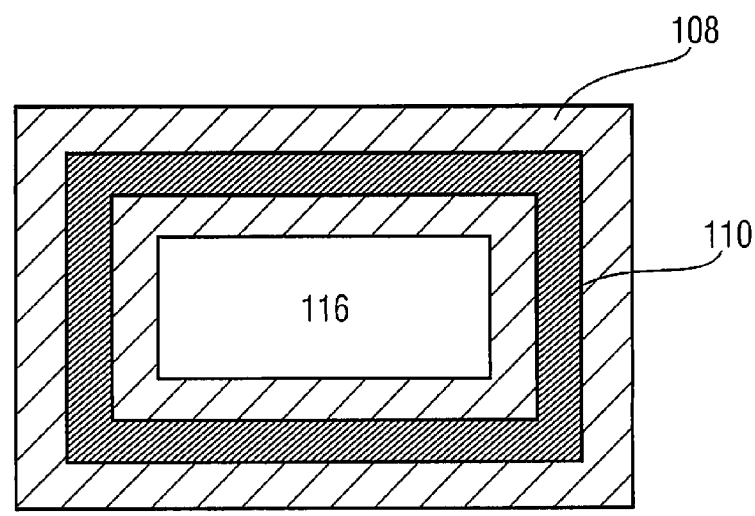

By an area between the first layer 102 and the second layer 104 or by an area between the optical components 114, an optically used area 116 is defined, like e.g. a cavity or an aperture. Groove 110 and tongue 112 of the two spacer parts 106, 108, according to embodiments, are implemented such that they circle the optically used area 116 in a closed contour, as it is, for example, illustrated in a top view according to FIGS. 3a, 3b. Although there a basically rectangular contour of the two spacer parts 106, 108 is illustrated, of course also further closed contours of the spacers 106, 108 and the associated groove 110 and tongue 112 are possible, like, for example, circular contours, contours having rounded corners or ovals.

The tongue 112 has such a small width b as compared to the groove 110, so that a lateral shifting (see horizontal or lateral double arrow in FIG. 2b) of the spacer parts 106, 108 to be joined is possible, when the tongue 112 engages the groove 110. For connecting the spacer parts 106, 108, an adhesive 118 is inserted into the groove and subsequently the second joining partner 106 is inserted into the groove 110 with its tongue 112. By this, the first and the second spacer part 106, 108 are connected to each other by an adhesion connection between groove 110 and tongue 112. Groove 110 and tongue 112 are here dimensioned such regarding their depth or length, that a sufficient overlapping area filled with the adhesive 118 results in the axial direction or the stacking direction (see vertical double arrow left in FIG. 2b). According to an embodiment of the present invention, the adhesive 118 is a permanently elastic material, in particular a permanently elastic polymer which comprises a higher coefficient of thermal expansion than the surrounding material of the groove 110 or the surrounding spacer material. The coefficient of expansion or the coefficient of thermal expansion is a characteristic value describing the performance of a material with respect to changes of its dimensions with temperature changes—thus often also called coefficient of thermal expansion. The effect which is responsible for this is thermal expansion. As thermal expansion with many materials is not even across all temperature ranges, also the coefficient of thermal expansion is temperature dependent and is thus given for a reference temperature or a temperature range. There is a difference between the coefficient of linear thermal expansion $\alpha$ (also called thermal linear expansion coefficient or thermal expansion) and the coefficient of spatial thermal expansion $\gamma$ (also coefficient of spatial expansion or volume expansion coefficient or cubic expansion coefficient).

Figure 4:
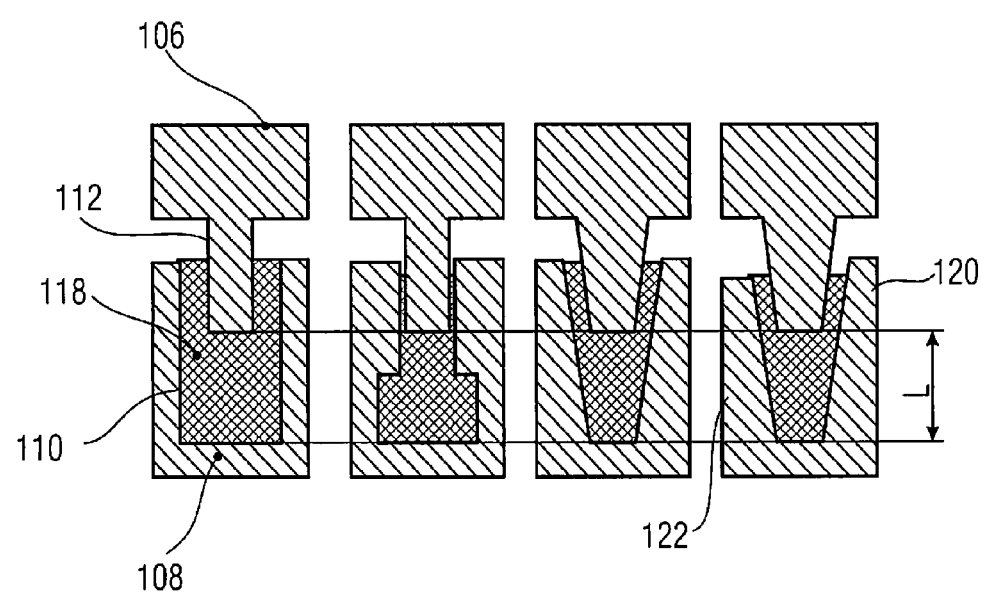
FIG. 4 are side views of spacer parts comprising tongue and groove according to embodiments of the present invention are illustrated.

With a temperature increase, thus the permanently elastic adhesive 118 expands more strongly and is restricted in its lateral (i.e. perpendicular to the stacking direction) expansion by the geometry of the groove. The expansion of the adhesive 118 thus mainly takes place in the axial (vertical or stacking direction) direction in which the groove 110 is not restricted upwards. As a consequence of the elasticity of the adhesive 118, no substantial compressive stresses are built up and thermal changes of volume are basically transferred into a change ΔL of the length or the height of the adhesive 118 contained in the groove 110, as it is schematically illustrated in FIG. 4. For athermizing the opto-electronic system 100, a given change of length ΔL has to be achieved per temperature change ΔT. With known coefficients of thermal expansion, thus the length L may be dimensioned. As a change of volume, ΔV, of the permanently elastic adhesive or permanently elastic polymer 118, as with all solid bodies, is approximately three times greater than a linear change of length, a greater change ΔL of the length L results as compared to an undirected, free thermal expansion of length. I.e. in the theoretical ideal case, assuming no thermal expansion of the groove material, a change of length may be achieved which is three times as large as compared to an unguided free expansion, as the volume expansion is completely transferred into a length expansion. The permanently elastic adhesive 118 thus fulfills two task: connecting the joining partners 106, 108 (upper part to tongue 112/bottom part to groove 110) and adapting the length change ΔL to a requested value in μm/Kelvin. The effect of the transfer of travel is greater the greater the difference between the coefficient of thermal expansion of the permanently elastic adhesive 112 and the groove material of the spacer 108.

FIG. 4 shows different implementations of tongue and groove configurations. Of particular interest here is the configuration illustrated on the right, in which the groove 110 has lateral boundaries 120, 122 of a different height. This causes a control of the flow direction of the still liquid adhesive 118 for the case that too much adhesive 118 was inserted into the gap or groove 110. The boundary of groove 110 is thus advantageously implemented so that adhesive or glue 118 flowing over as a consequence of different trench depths or lateral boundaries 120, 122 may not flow into the optical area 116 (see FIG. 2b). The side wall 120 of the groove 110 facing the optical area 116 is thus advantageously higher than the sidewall 122 of the groove 110 facing away from the optically used area 116.

Figure 5A:
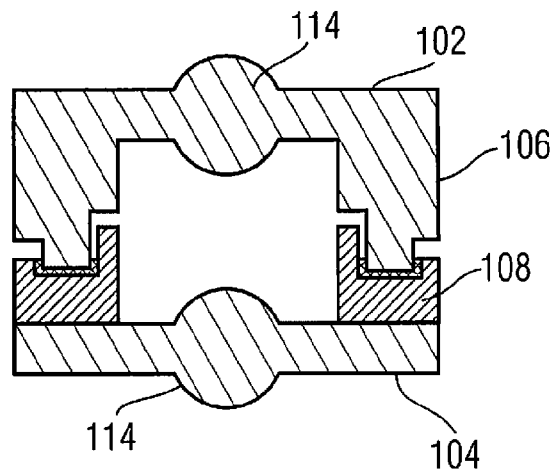
FIGS. 5a-e show side views of optical layer stacks according to still further embodiments of the present invention.
Figure 5B:
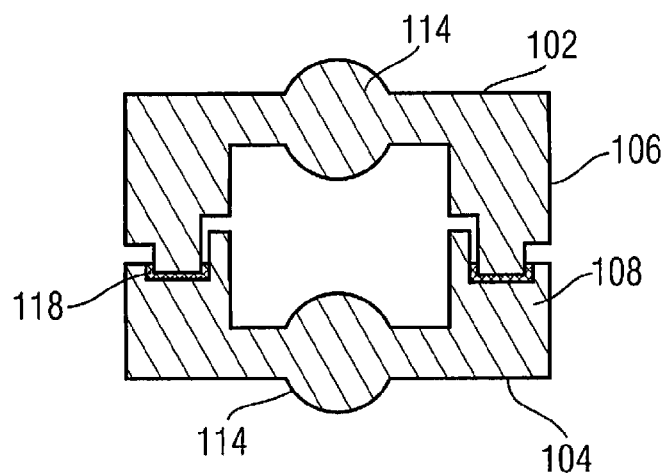
Figure 5C:
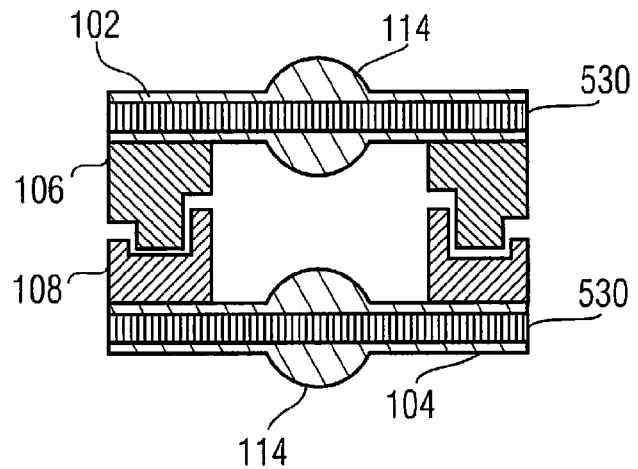
Figure 5D:
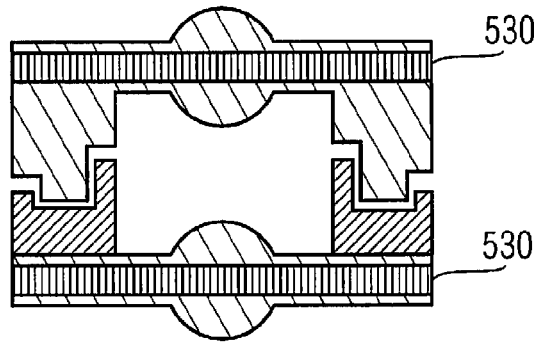
Figure 5E:
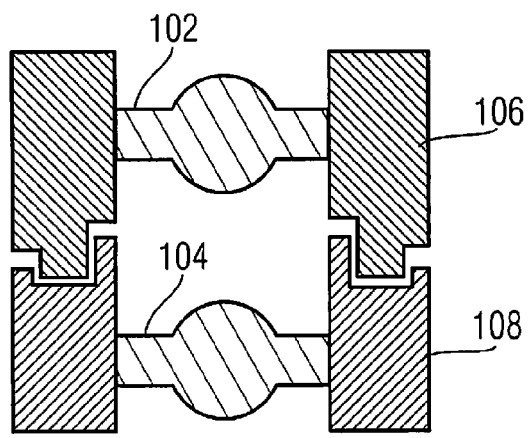

The groove 110 and/or tongue 112, according to embodiments, may already be integrated into the layers 102, 104 with optically effective elements 114, so that only one (see FIG. 5a) or no additional member is needed (see FIG. 5b). I.e., according to embodiments, the first spacer part 106 and the first layer 102 are implemented integrally and/or the second spacer part 108 and the layer 104 are implemented integrally. The optically effective layers 102, 104, according to embodiments, may also be arranged on a substrate 530, in particular a glass substrate, wherein the spacer parts 106, 108 are formed separately from the layers 102, 104 (see FIG. 5c). Further, the optically effective areas or layers 102 and/or 104 may be arranged on a substrate 530 and at the same time contain the spacer parts 106 and/or 108, i.e. being manufactured integrally with the same (see FIG. 5d). According to a further embodiment, the layers 102 and/or 104 may also be arranged between spacer parts 106, 108, as it is schematically illustrated in FIG. 5e. The present invention is here not only restricted to embodiments exemplarily illustrated in FIGS. 5a-e. Rather, also embodiments are included which comprise any combinations of the arrangements according to FIGS. 5a-e. I.e., for example, the upper integral part of FIG. 5a may also be combined with the lower part according to FIG. 5e, etc.

Figure 6:
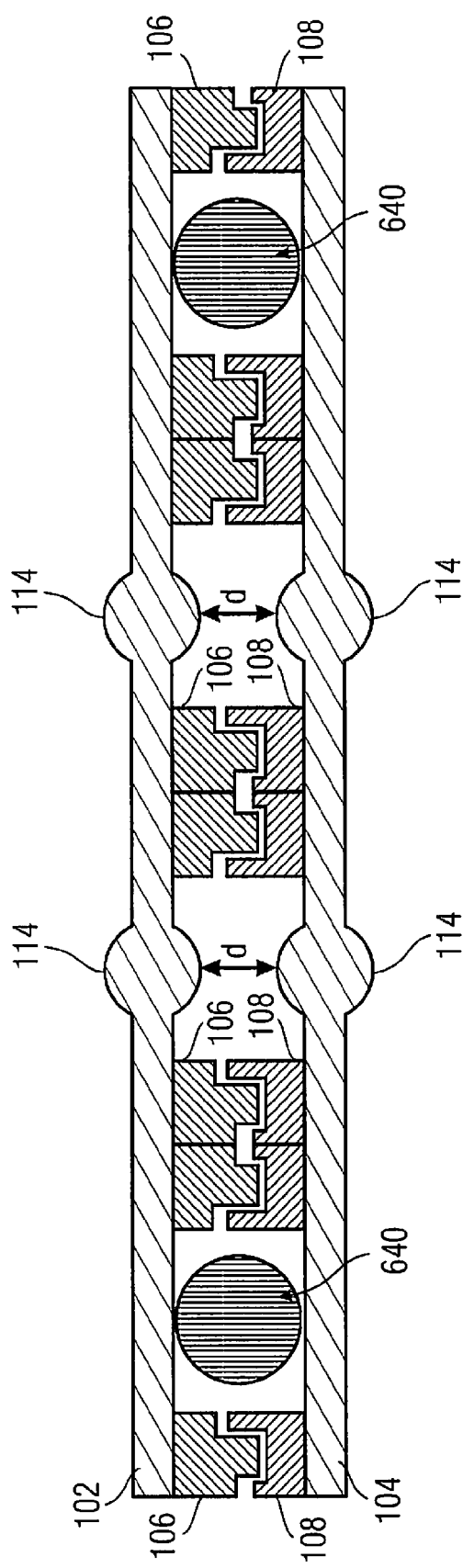
FIG. 6 shows an axial positioning of an optical layer stack by introducing highly precise bodies according to one embodiment.

A lateral positioning of the joining partners 106, 108 may be executed actively, e.g. using an evaluation of optical parameters or using mechanical alignment structures, which may be attached to any positions on a wafer 102, 104. An axial positioning, i.e. the positioning in stacking direction, which sets a distance d of the optically effective components 114, may be executed actively, e.g. using an evaluation of optical parameters or introducing highly precise bodies 640 which mechanically set the distance d. This is schematically plotted in FIG. 6. From this, all in all a decoupling of manufacturing tolerances of the spacers 106, 108 from the requested tolerances results for the axial distances d of the optically effective components 114. If additional components for achieving an optically used area 116 between the optically effective areas or layers 102, 104 are used, the same may be manufactured from a different material and thus comprise different optical and mechanical characteristics, like for example transparency and thermal expansion.

Figure 7:
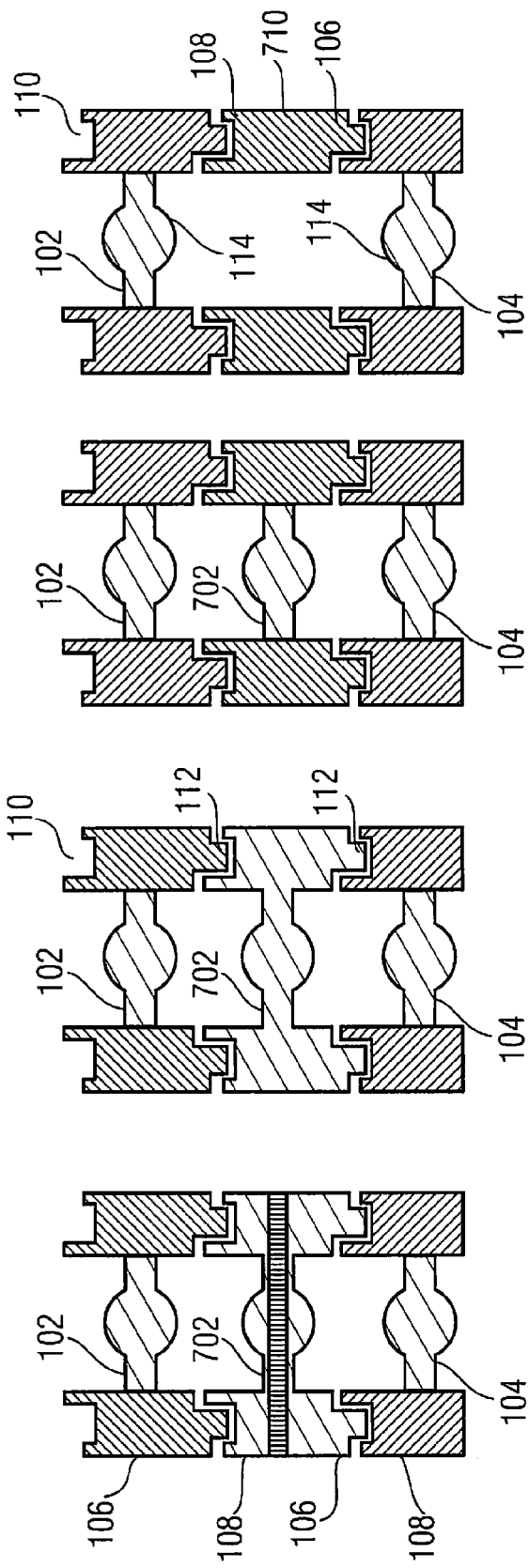
FIG. 7 shows a plurality of optical surfaces stacked one on top of the other according to embodiments of the present invention.

In FIG. 7, it is illustrated that several optical areas or layers 102, 104, 702 may be arranged on top of each other, wherein spacer structures 106, 108 comprising groove 110 and tongue 112 may be arranged on both sides of associated optically effective layers 102, 104, 702. The optical areas or layers 102, 104, 702 may here be arranged on substrates 530, contain groove and/or tongue structures 110, 112 or be located between additional spacer components 710 which may comprise groove and/or tongue elements 110, 112 on both sides. Further, additional spacer members or components 710 may also be introduced without optically effective areas, again comprising groove and/or tongue structures 110, 112. The spacer components 710 comprising groove and/or tongue elements 110, 112 on both sides, may again be provided separated into a first and a second spacer part 106, 108, wherein a tongue 112 is associated with the first spacer part 106 and a groove 110 is associated with the second spacer part 108 or vice versa.

The additional spacer parts 106, 108 or 710 used as spacers may advantageously consist of polymers and may be manufactured in a cost-effective method like casting, injection molding, hot stamping, injection stamping or resin transfer molding (RTM). As a polymer for the spacers 106, 108 or 710 epoxides may be used which withstand high temperatures and whose optical transmission (permeable to non-permeable) may be influenced. As an adhesive or glue 118 for connecting the components among others the same epoxide may be used which after curing also leads to a quasi-monolithical setup of a housing surrounding the optical components 102, 104, 114, 702, which leads to advantages with respect to thermostability and reliability of the overall setup. The geometry of the spacer parts 106, 108 or 710 may be selected so that the same may be used as diaphragms for defining the aperture, the field, the vignetting (i.e. a shadowing towards an image edge, caused by an axial arrangement of two openings) and for influencing false lights.

Figure 8:
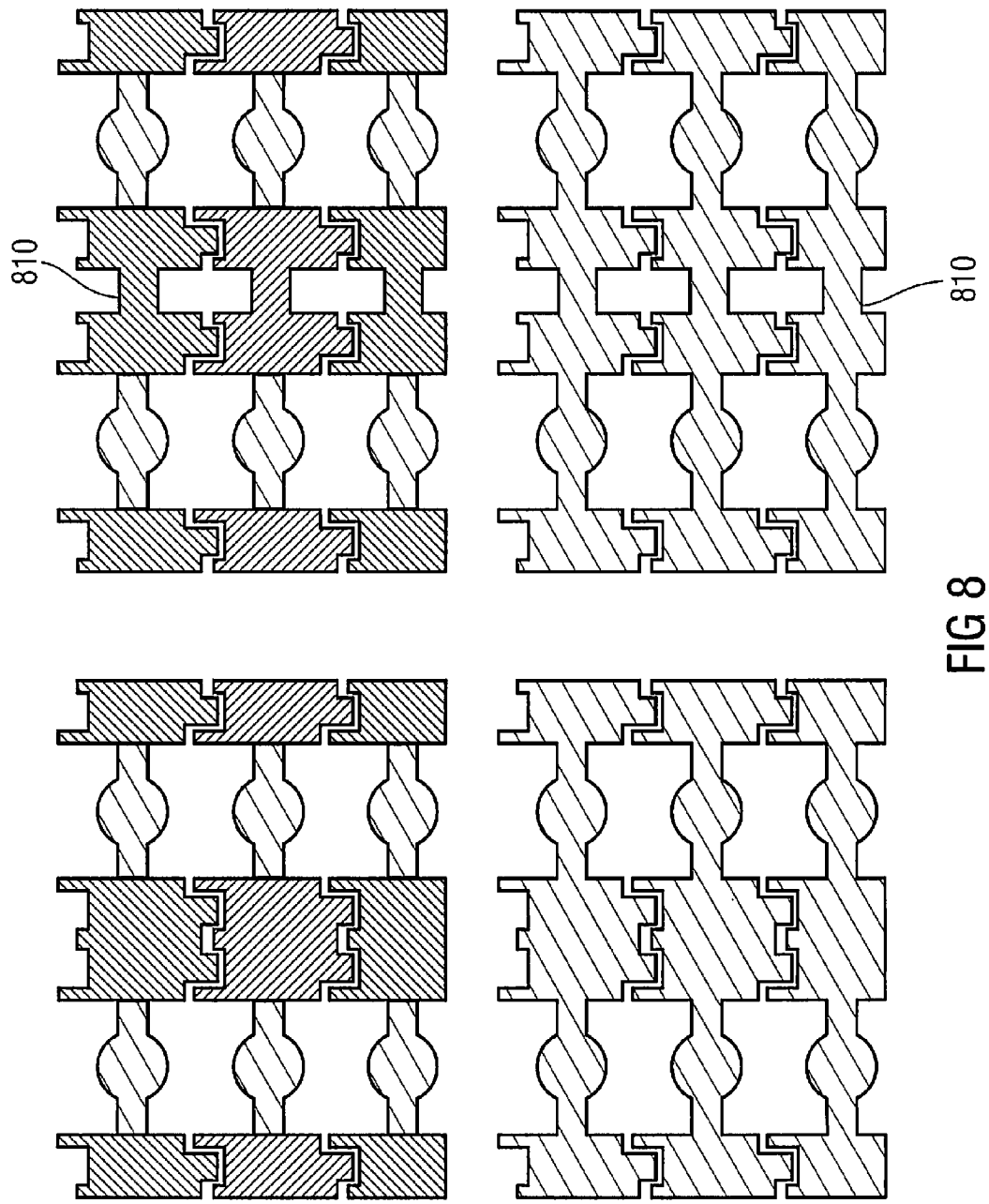
FIG. 8 shows a schematical illustration of optical layer stacks manufactured in a panel according to different embodiments of the present invention.

As it is schematically illustrated in FIG. 8, systems manufactured on panels, i.e. on wafer level, may be connected to neighboring optical systems in directly sequence (FIG. 8, left) or via thinned areas 810 (FIG. 8, right). The latter simplify a separation process when liberating individual systems from a useful unit. Bridges 810 between the individual areas with optically effective surfaces are here to be regarded such that they guarantee the needed mechanical stability for handling and mounting. Tongue and groove structures may be integrated in the component containing the optical functional surfaces or be contained in additional devices, as already described in detail above.

Figure 9:
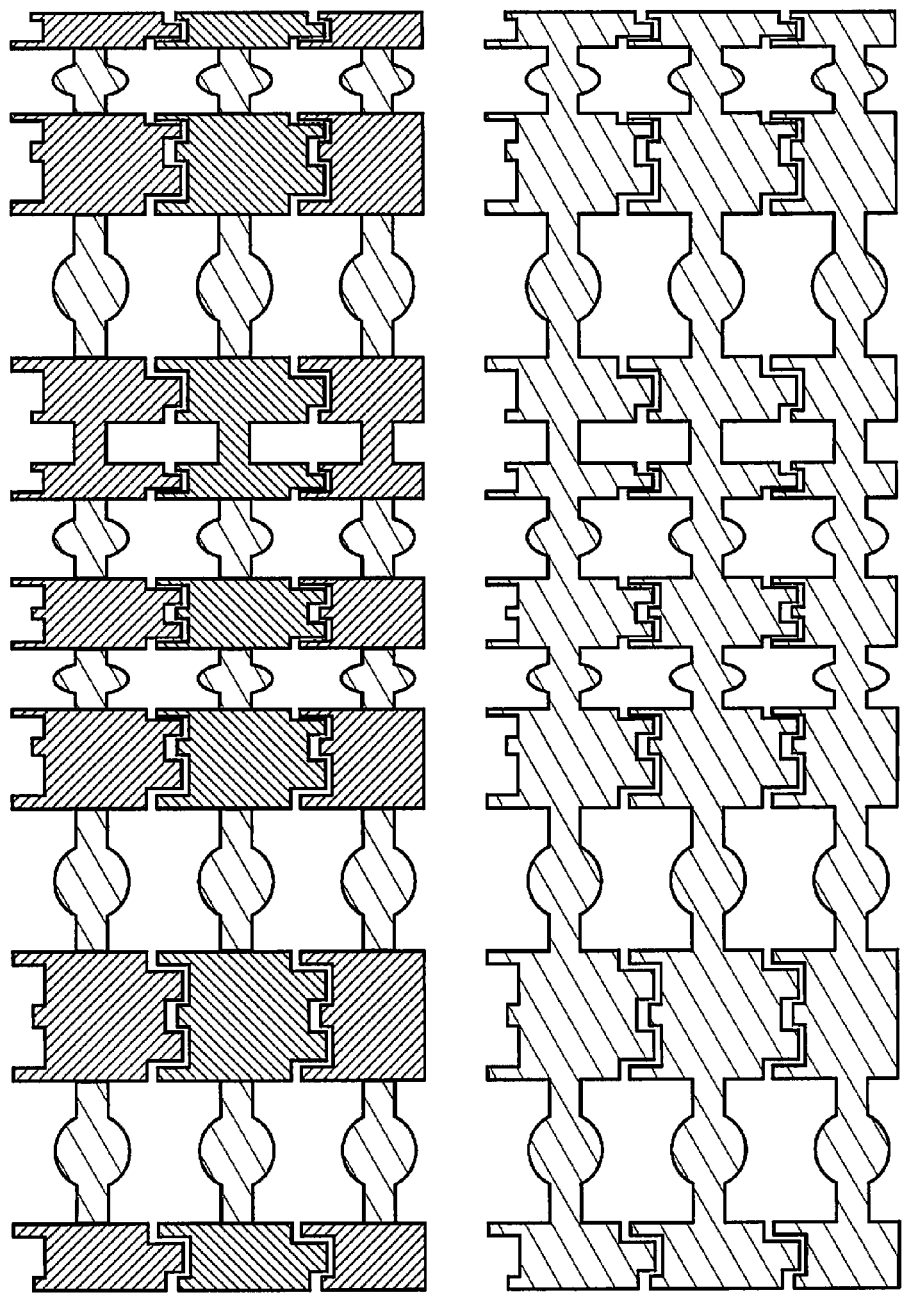
FIG. 9 shows a schematical illustration of a plurality of optical layer stacks comprising different optical functional surfaces.
Figure 10A:
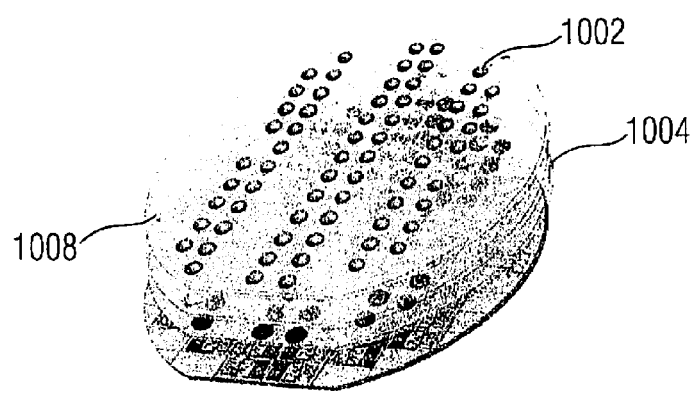
FIGS. 10a-c show optical layer stacks according to conventional technology.
Figure 10B:
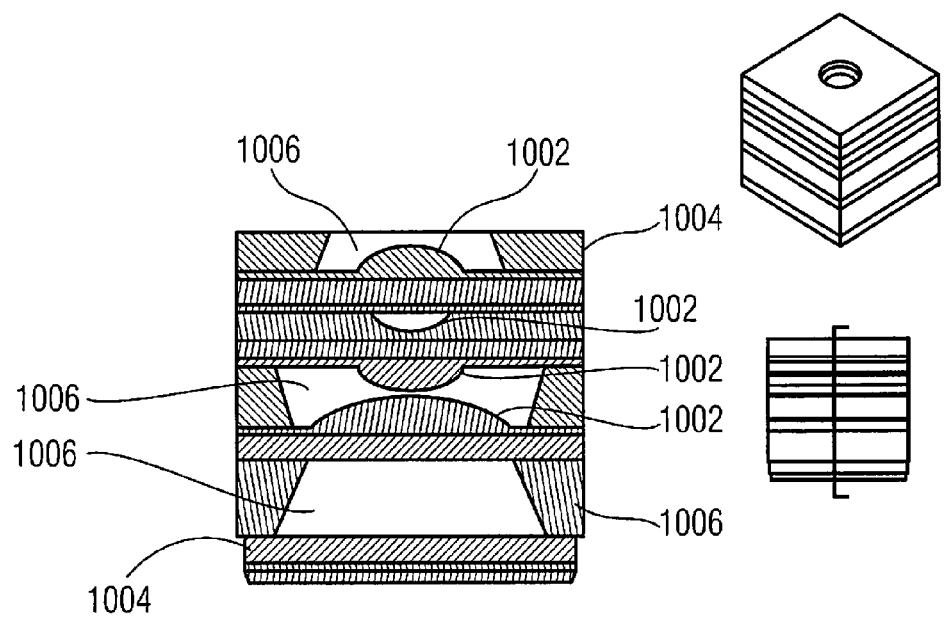
Figure 10C:
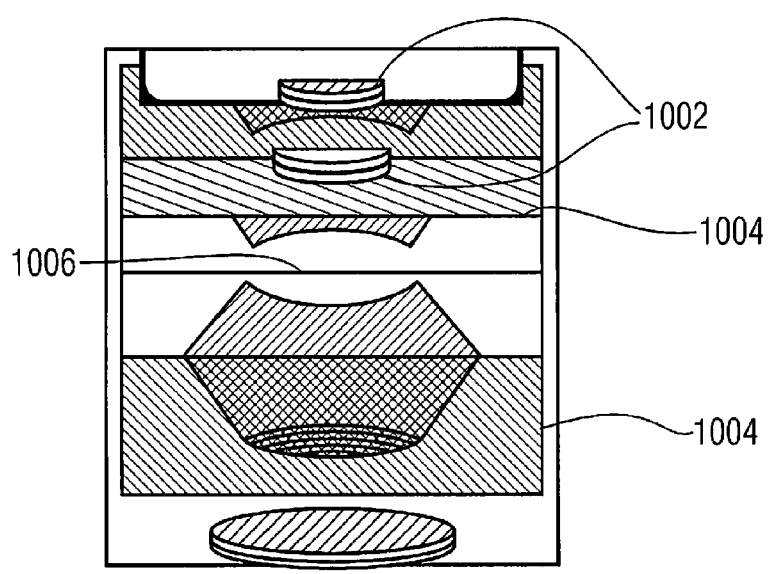

Adjacent optical layer stacks manufactured on wafer level may comprise different optical functional surfaces and mechanical structures, as it is schematically illustrated in FIG. 9. Several optical functional surfaces arranged next to each other may be associated with a larger unit. These combined units may again be directly adjacent or be connected via thinned areas.

By embodiments of the present invention, i.e. by an implementation of a component pairing of spacers 106, 108 in a groove and tongue structure and by adapting the axial overlapping length of groove 110 and tongue 112, manufacturing tolerances of mechanical structures (spacers 106, 108) may be decoupled from those of optical structures (layers 102, 104). By this, a cost advantage may be achieved in two respects. On the one hand costs for manufacturing additionally needed spacer layers or spacer wafers decrease. On the other hand, a yield of systems manufactured in the panel, i.e. on wafer level, increases. The spacer structures may still be manufactured in a cost-effective and light-impermeable polymer and thus eliminate otherwise needed additional components and manufacturing steps for preventing false light.

Further, using embodiments of the present invention, in a simple and cost-effective way, a compensation of a thermally induced change of the refractive power of optical modules, like e.g. with camera objectives, may be enabled. The inventive concept is suitable for manufacturing in the panel, i.e. on wafer level, and may thus avoid a manual individual mounting including the connected cost advantages. The compensation of the thermal influence is passive without the use of additional energy sources or elements as actuators.

Although some aspects of the present invention were described in connection with a device, i.e. with an optical layer stack, it is obvious that these aspects also represent a description of a corresponding manufacturing method, i.e. a block or a device of the optical layer stack may also be regarded as a corresponding method step or a feature of a method step. I.e., embodiments of the present invention also include a method for manufacturing an optical layer stack 100 by arranging a first layer 102 on top of a second layer 104 using a first spacer part 106 associated with the first layer and a second spacer part 108 associated with the second layer, wherein the two spacer parts 106, 108 comprise groove 110 and tongue 112 for an engagement in a stacking direction of the optical layer stack in order to provide a connection between the first and the second spacer part 106, 108 and a spacing of the first and second layer 102, 104 in stacking direction.

Analog to that, aspects described in connection with or as a method step also represent a description of a corresponding block or detail or feature of an inventive optical layer stack.

The above embodiments thus also show an optical layer stack having a first layer 102, a second layer 104; a first spacer part 106 associated with the first layer and a second spacer part 108 associated with the second layer, wherein the two spacer parts 106, 108 comprise groove and tongue 110, 112 or trench or recess and associated protrusion—for engaging in a stacking direction of the optical layer stack, and for a shiftability of the first spacer part 106 with respect to the second spacer part 108 in the lateral direction and in the stacking direction the tongue comprises a smaller width than the groove, wherein the first and the second spacer part 106, 108 are connected to each other by means of an adhesive between groove 110 and tongue 112 in order to provide a connection between the first and the second spacer part 106, 108 and a spacing of the first and the second layer 102, 104 in stacking direction. The spacing of the first and second layer (102; 104) in stacking direction by the adhesive is advantageously set so that the walls of the groove are spaced apart from the spacer part 106 comprising the tongue, as illustrated in FIG. 4. The thus resulting spacing may be used as a "maneuvering distance" for decoupling manufacturing tolerances of the spacers 106, 108 from requested tolerances for spacing the first and second layer (102; 104) or for adjusting the layers with respect to each other in the axial direction. The spacing of the first and second layer (102; 104) in stacking direction by the adhesive is here advantageously so that the panels are spaced apart from a bottom of the groove by a length L unequal 0, and spaced apart from the floor, beyond the length L, the adhesive is located in the groove. In other words, the tongue is not inserted into the groove in the axial direction up to a stop in order to be fixed in this axial position by the adhesive, but is held in a not completely inserted position in stacking direction, so that in both directions along the layer stacking axis, adjustment possibilities for balancing above-mentioned manufacturing tolerances exist. The indications given here also apply to positioning and adjusting in lateral direction. Also here, the tongue is not fixed in a stop position in the groove by the adhesive. Rather, a position of the tongue spaced apart in both lateral dimensions from the walls of the groove is fixed by the adhesive to be able to compensate for corresponding manufacturing tolerances. Further, the above embodiments thus also describe a method for manufacturing an optical layer stack, comprising the following steps: arranging a first layer 102 on top of a second layer 104 using a first spacer part 106 associated with the first layer and a second spacer part 108 associated with the second layer, wherein the two spacer parts 106; 108 comprise groove 110 and tongue 112 for an engagement in a stacking direction of the optical layer stack and for a shifting of the first spacer part 106 with respect to the second spacer part 108 in the lateral direction and in the stacking direction the tongue has a smaller width than the groove; and connecting the first and second spacer part 106; 108 to each other adhesively by means of an adhesive between groove 110 and tongue 112 in order to provide a connection between the first and the second spacer part 106; 108 and a spacing of the first and the second layer 102; 104 in stacking direction. The arrangement may include: inserting the adhesive into the groove; putting the tongue into the groove with a still liquid state of the adhesive; positioning the first and the second spacer part with respect to each other in the stacking direction using an evaluation of optical parameters or by introducing highly precise bodies (640) between the first and the second layer; and hardening the adhesive. Arranging may here comprise positioning the first and second spacer part with respect to each other in a lateral direction using an evaluation of optical parameters or utilizing mechanical alignment structures.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An optical layer stack, comprising:
a first layer;
a second layer;
a first spacer part associated with the first layer; and a second spacer part associated with the second layer, wherein the two spacer parts comprise groove and tongue for an engagement in a stacking direction of the optical layer stack and for a shiftability of the first spacer part with respect to the second spacer part in the lateral direction and in the stacking direction the tongue comprises a smaller width than the groove, wherein the first and the second spacer part are connected to each other by means of an adhesive between groove and tongue in order to provide a connection between the first and the second spacer part and a spacing of the first and second layer in stacking direction; and wherein the groove has a bottom which is surrounded by two side walls, and a wall of the groove facing an optical used area is higher than a wall of the groove facing away from the optically used area.

2. The optical layers stack according to claim 1, wherein the first and/or second layer comprises an optical component.

3. The optical layer stack according to claim 2, wherein the optical component of the first and/or second layer is part of the group of lenses, prisms, diffractive structures, holographic structures or optical filters.

4. The optical layer stack according to claim 1, wherein the first spacer part is firmly bonded to the first layer and wherein the second spacer part is firmly bonded to the second layer.

5. The optical layer stack according to claim 1, wherein by an area between the first layer and the second layer the optically used area is defined, and wherein groove and tongue of the two spacer parts are implemented such that they circle the optically used area in a closed contour.

6. The optical layer stack according to claim 1, wherein the adhesive is a permanently elastic material with a greater coefficient of thermal expansion than a material of a first and/or second spacer.

7. The optical layer stack according claim 6, wherein a depth of the groove into which the permanently elastic material is introduced is adapted such that with a change of temperature a change of the distance of the first layer and the second layer results which is greater than a resulting change merely as a consequence of an isotropic thermal expansion of the groove, tongue and adhesive material.

8. The optical layer stack according to claim 6, wherein the adhesive is a polymer which is also used as a material of the first and/or second spacer.

9. The optical layer stack according to claim 1, wherein the first layer carries or forms an imaging optics and a coefficient of thermal expansion of the adhesive and a shape of a groove and the tongue are selected so that across a temperature range from −40° to 80° C. a distance of an image plane of the imaging optics in the direction of an optical axis of the imaging optics to the second layer deviates by less than ±1% of an objective focal length of the imaging optics at 20° C. from a position of the image plane at 20° C.

10. The optical layer stack according to claim 1, wherein the first layer carries or forms a first imaging optics and the second layer a second imaging optics and a coefficient of thermal expansion of the adhesive and a shape of the groove and the tongue are selected so that across a temperature range from −40° to 80° C. a distance of an image plane of the first imaging optics in the direction of a common optical axis of the first and second imaging optics towards an object plane of the second imaging optics deviates from zero by less than ±1% of the greater ones of the objective focal lengths of the first and second imaging optics at 20° C.

11. The optical layer stack according to claim 1, wherein the first spacer part and the first layer are implemented integrally and/or the second spacer part and the second layer are implemented integrally.

12. The optical layer stack according to claim 1, wherein by an area between the first layer with the optical component and the second layer the optically used area is defined, and wherein a geometry of the spacer parts is adapted so that the same serve as diaphragms for defining an aperture, a vignetting and/or for influencing false light.

13. The optical layer stack according to claim 1, wherein the spacing of the first and second layer in stacking direction by the adhesive is so that the walls of the groove are still spaced apart from the spacer part comprising the tongue.

14. The optical layer stack according to claim 11, wherein the spacing of the first and the second layer in stacking direction by the adhesive is so that the tongue is spaced apart from a bottom of the groove by a length L and from the bottom beyond the length L the adhesive is comprised in the groove.

15. The optical layer stack according to claim 1, wherein by an area between the first layer and the second layer the optically used area is defined.

16. A method for manufacturing an optical layer stack, comprising:

arranging a first layer above a second layer using a first spacer part associated with the first layer and a second spacer part associated with the second layer, wherein the two spacer parts comprise groove and tongue for an engagement in a stacking direction of the optical layer stack and for a shiftabiltiy of the first spacer part with respect to the second spacer part in the lateral direction and in the stacking direction the tongue comprises a smaller width than the groove, wherein the groove has a bottom which is surrounded by two side walls, and a wall of the groove facing an optically used area is higher than a wall of a groove facing away from the optically used area; and connecting the first and the second spacer part to each other adhesively by means of an adhesive between groove and tongue in order to provide a connection between the first and the second spacer part and a spacing of the first and second layer in stacking direction.

17. The method according to claim 14, wherein arranging further comprises:

inserting the adhesive into the groove;

putting the tongue into the groove, wherein the adhesive is still in a liquid state;

positioning the first and the second spacer parts with respect to each other in a stacking direction using an evaluation of optical parameters or by introducing highly precise bodies between the first and the second layer; and hardening the adhesive.

18. The method according to claim 17, wherein arranging further comprises:

positioning the first and the second spacer parts with respect to each other in the lateral direction using an evaluation of optical parameters or using mechanical alignment structures.

19. An optical layer stack, comprising:

a first layer;

a second layer;

a first spacer part associated with the first layer; and a second spacer part associated with the second layer;

wherein the two spacer parts comprise groove and tongue for an engagement in a stacking direction of the optical layer stack and for a shiftability of the first spacer part with respect to the tongue comprises a smaller width than the groove, wherein the first and the second spacer part are connected to each other by means of an adhesive between groove and tongue in order to provide a connection between the first and the second spacer part and a spacing of the first and second layer in stacking direction;

wherein the adhesive is a permanently elastic material with a greater coefficient of thermal expansion than a material of the first and/or second spacer; and wherein the first layer carries or forms an imaging optics and a coefficient of thermal expansion of the adhesive and a shape of a groove and the tongue are selected so that across a temperature range from −40° to 80° C. a distance of an image plane of the imaging optics in the direction of an optical axis of the imaging optics to the second layer deviates by less than ±1% of an objective focal length of the imaging optics at 20° C. from a position of the image plane at 20° C., or wherein the first layer carries or forms a first imaging optics and the second layer a second imaging optics and a coefficient of thermal expansion of the adhesive and a shape of the groove and the tongue are selected so that across a temperature range from −40° to 80° C. a distance of an image plane of the first imaging optics in the direction of a common optical axis of the first and second imaging optics towards an object plane of the second imaging optics deviates from zero by less than ±1% of the greater ones of the objective focal lengths of the first and second imaging optics at 20° C.

* * * * *